July 25, 1939.  E. D. SCHNEIDER  2,167,530

SYSTEM OF DYNAMIC BRAKING

Filed Nov. 1, 1938

Inventor:
Elbert D. Schneider,
by Harry E. Dunham
His Attorney.

Patented July 25, 1939

2,167,530

UNITED STATES PATENT OFFICE 2,167,530

SYSTEM OF DYNAMIC BRAKING

Elbert D. Schneider, Scotia, N. Y., assignor to General Electric Company, a corporation of New York Application November 1, 1938, Serial No. 238,174

9 Claims. (Cl. 172—179)

My invention relates to control systems and more particularly to control systems for use with electric motors energized from electric valve converting apparatus.

In certain applications of motors energized by an electric valve converting apparatus it is desirable to operate the motor at several different speeds and the change from one speed to another should be made as rapidly as possible. Such a requirement is encountered in certain machines where there is a rapid movement followed by a relatively slow movement and at the end of the time for the rapid movement a limit switch may be actuated to change the speed to the lower value. In accordance with my invention this is accomplished by dynamically braking the motor.

It is an object of my invention to provide a new and improved control system for motors operating from an electric valve converting apparatus.

Another object of my invention is to provide a new and improved control system for dynamically braking motors which are energized by an electric valve converting apparatus.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawing in which Fig. 1 represents a control arrangement embodying my invention and Fig. 2 represents a modification of a portion of the control arrangement shown in Fig. 1.

Figure 1:
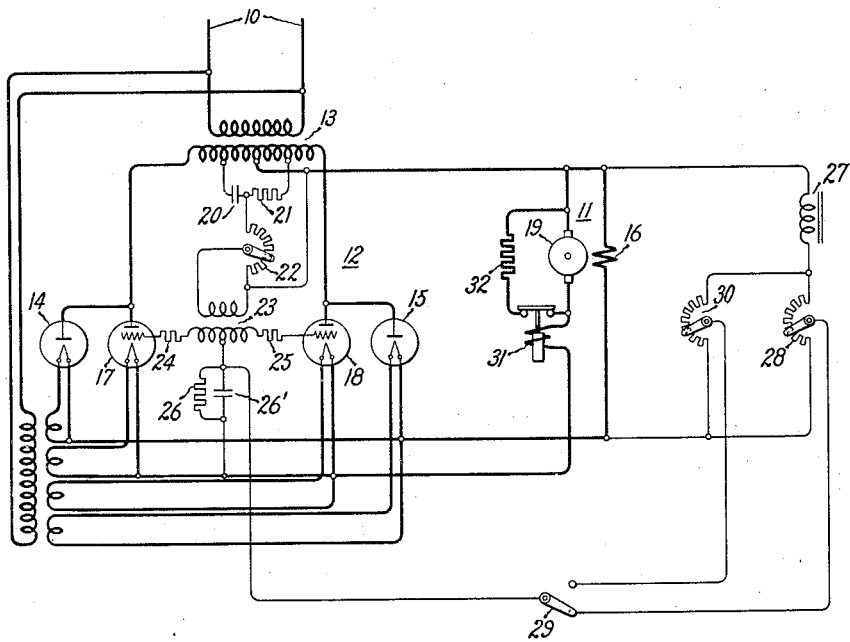

Referring more particularly to Fig. 1, I have shown therein an alternating current supply circuit 10 and a direct current motor 11 which are interconnected by an electric valve converting apparatus 12. Tht electric valve converting apparatus 12 includes a transformer 13 having a primary winding connected to the alternating current circuit 10 and the secondary winding connected at an intermediate point thereon to one side of the direct current motor 11. The outer extremities of the secondary winding of the transformer 13 are connected to one group of valves 14 and 15 shown as having an anode and a cathode enclosed within an envelope containing an ionizable medium and connected to supply energy to the field excitation winding 16 of the direct current motor 11. The outer extremities of the secondary winding of the transformer 13 are also connected to a second group of electric valves 17 and 18, which for the purposes of illustration have been shown as each having an anode, a cathode and a control grid enclosed within an envelope containing an ionizable medium and being arranged to supply energy to the armature 19 of the direct current motor 11. A portion of the secondary winding of the transformer 13 is connected to energize a phase shifting circuit comprising a capacitor 20, a fixed resistor 21 and an adjustable resistor 22. This phase shifting circuit is connected to energize a transformer 23 which is provided with secondary windings each connected in the control circuit for the valves 17 and 18, respectively. The control circuit for the electric valves 17 and 18 may be provided with current limiting resistors such as 24 and 25 and the common connection between the two portions of the secondary winding of the transformer 23 of the two control circuits is connected through a resistor 26, which is by-passed by a capacitor 26', to the common cathode connection of the valves 17 and 18. A direct current potential is impressed across the resistor 26 by means of a control circuit which includes a smoothing reactor 27, an adjustable resistor 28 and a switch 29. The switch 29 is a two-point switch the other contact of which is connected to the movable arm of an adjustable resistor 30 which is connected in parallel with the adjustable resistor 28. The reactor 27 serves to reduce the pulsations which occur across the adjustable resistors 28 and 30 connected across the field excitation winding. The control circuits of the valves 17 and 18 therefore receive a direct current potential corresponding to the voltages appearing across the field winding 16 and the armature winding 19 of the direct current motor 11. This will become apparent by tracing the circuit from the upper terminal of the resistor 26 through the switch 29, the adjustable resistor 28, the reactor 27, through the armature winding 19 of the direct current motor 11 to the common cathode connections of the valves 17 and 18. Thus the voltage appearing across the armature winding 19 together with a portion of the voltage appearing across the field winding 16 is applied to the control circuits of the valves 17 and 18. The circuit of the armature winding 19 of the direct current motor 11 includes an actuating coil of a relay 31, having contacts arranged to close the circuit through a loading circuit which may be a resistor 32 arranged to be connected across the armature 19. During normal operation the relay 31 is actuated so as to open the contacts thereof so that full voltage is applied to the armature 19.

If it is now assumed that the resistors 30 and 28 are of different values the lower contact of the switch 29 may be regarded as the one producing the higher speed and the upper contact as the one producing the lower speed of the motor 11. During normal operation at the higher speed the switch 29 is at the lower contact and alternating current is supplied from the circuit 10 to the electric valve converting apparatus 12 so that the field excitation winding 16 of the direct current motor 11 is supplied with current by means of the valves 14 and 15 and the armature 19 is supplied with current by the valves 17 and 18. The flow of current through the relay 31 causes the contacts thereof to become opened so that the motor produces full torque and speed. When the motor has reached the limit of its normal high speed operation a limiting switch, for example, may actuate the switch 29 to the upper terminal to cause the motor to reduce its speed. Changing the switch 29 from the lower terminal to the upper terminal changes the direct current voltage appearing across the resistor 26 in the common connection of the control circuit of the valves 17 and 18 so that initially the valves become nonconductive or are reduced in conductivity to such an extent as to be substantially non-conductive. The reduction or cessation of current flow through the armature 19 causes the relay 31 to close its contacts thus connecting the loading circuit for resistor 32 across the armature 19 thus dynamically braking the motor and causing it to rapidly reduce in speed. When the motor speed has been reduced to its desired speed as determined by the adjustment of the adjustable resistor 30 the voltage appearing across the terminals of the armature will be such that the resultant negative bias applied to the control electrodes of the valves 17 and 18 no longer causes them to remain substantially nonconductive and these valves again become more conductive thus supplying current to the armature and opening the relay 31 to interrupt the dynamic braking connection. The current supplied to the armature 19 with the switch 29 on the upper contact will be less than that at the higher speed since the control circuit for the valves now receive a higher negative bias than when the switch 29 is in the high speed position. This operation will readily become apparent to those skilled in the art since it may be considered that the voltage appearing across the armature 19 supplies a predetermined negative voltage component to the grid circuit and that the voltage appearing across the inductor 27 and either the resistor 28 or 30 supplies a predetermined positive voltage component to the control circuit. It is preferable to have the resultant voltage comprise a negative bias for the control circuit and the magnitude of this negative bias is the factor which determines the degree of conductivity of the valves 17 and 18 as well as the phase relation and the magnitude of the voltage produced by the alternating component introduced into the control circuit by the transformer 23. Thus whenever a predetermined electrical condition of the motor 11 is obtained during the speed reducing operation, the valves 17 and 18 will again become conductive to supply current thereto at a lower rate than during the previous operation.

Figure 2:
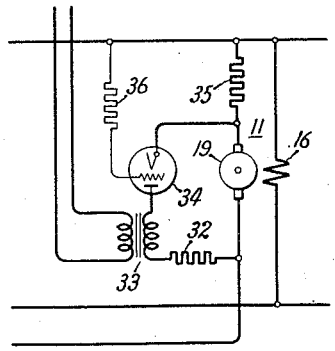

The modification of the arrangement of Fig. 1 as shown in Fig. 2 shows how the loading circuit across the armature 19 of the direct current motor 11 may be controlled by means of an electric valve. The loading circuit now comprises a resistor 32 connected in series with one winding of a transformer 33 and an electric valve 34 which may have an anode, a cathode, and a control grid enclosed within an envelope containing an ionizable medium. During the high speed operation the valve 34 is nonconductive, and in order to render the valve conductive in response to a decrease in the flow of current through the armature 19 a resistor 35 is connected in series with the armature. The control circuit for the valve 34 thus comprises the resistor 35 and the current limiting resistor 36. The primary winding of the transformer 33 is connected through a suitable source of alternating current such as the alternating current circuit 10 of Fig. 1. The transformer is preferably so designed as to produce relatively high voltage peaks so that when the motor 11 has been reduced in speed to a predetermined amount the voltage appearing across the resistor 35 may allow valve 34 to again become nonconductive during one of the negative half cycles of alternating potential introduced into the anode circuit by the transformer 33. The operation of the arrangement shown in Fig. 1 as modified by the electronically controlled dynamic braking circuit shown in Fig. 2 will in all other respects be similar.

While for the purposes of illustration and simplicity in description of the operation of the system certain of the valves have been shown as comprising an anode, a cathode, and a control grid enclosed within an envelope containing an ionizable medium it of course will be apparent to those skilled in the art that any of the valves in common use may be utilized. Furthermore, although a single phase alternating current circuit 10 has been shown, a polyphase circuit may be utilized together with an electric valve converting apparatus of a suitable type and that if desired the field excitation winding of the direct current motor may be energized from any other suitable source of direct current.

While I have shown and described my invention in connection with certain specific embodiments it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States is:

1. The combination comprising a source of alternating current, a direct current motor having an armature winding, an electric valve converting apparatus interconnecting said source with said motor, said converting apparatus including a group of valves for supplying energy from said source to said motor armature winding, control means for reducing the conductivity of said group of valves to a predetermined amount thereby to reduce the speed of said motor, and means responsive to said first means for dynamically braking said motor until a predetermined speed is obtained.

2. The combination comprising a source of alternating current, a direct current motor having an armature winding, an electric valve converting apparatus interconnecting said source of said motor, said converting apparatus including a group of valves for supplying energy from said source to said motor armature winding, control means for reducing the conductivity of said group of valves to a predetermined amount thereby to reduce the speed of said motor, and electric valve means responsive to said reduced conductivity of said group of valves for dynamically braking said motor until a predetermined speed is obtained.

3. The combination comprising a source of alternating current, a direct current motor having an armature winding, an electric valve converting apparatus interconnecting said source and said motor, said converting apparatus including a group of valves for supplying energy from said source to said motor armature winding, control means for rendering nonconductive said group of valves thereby to reduce the speed of said motor, and means responsive to said first means for dynamically braking said motor by shunting said aramture winding until a predetermined speed is obtained.

4. The combination comprising a source of alternating current, a direct current motor having an armature winding and a field winding, an electric valve converting apparatus connected between said source and said motor, said apparatus including a group of valves for energizing said field winding, a second group of control valves for energizing said armature winding, control means for rendering substantially nonconductive said second group of valves thereby to reduce the speed of said motor, and means responsive to the substantial nonconductivity of said second group of valves for dynamically braking said motor until a predetermined speed is obtained.

5. The combination comprising a source of alternating current, a direct current motor having an armature winding, an electric valve converting apparatus interconnecting said source and said motor, said converting apparatus including a group of valves for supplying energy from said source to said motor armature winding, control means for rendering nonconductive said group of valves thereby to reduce the speed of said motor, a resistor arranged to be connected in parallel with said motor armature winding, and means responsive to the nonconductivity of said group of valves for connecting said resistor in parallel with said motor armature winding until a predetermined speed is obtained.

6. The combination comprising a source of alternating current, a direct current motor having an armature winding, an electric valve converting apparatus interconnecting said source and said motor, said converting apparatus including a group of valves for supplying energy from said source to said motor armature winding, control means for rendering substantially nonconductive said group of valves thereby to reduce the speed of said motor, a resistor connected in series with an electric valve, said resistor and said valve being connected in parallel with said motor armature winding, and means responsive to the substantial nonconductivity of said group of valves for rendering conductive said latter valve thereby to dynamically brake said motor until a predetermined speed is obtained.

7. The combination comprising a source of alternating current, a direct current motor having an armature winding, an electric valve converting apparatus interconnecting said source and said motor, said electric valve converting apparatus including a group of valves for controlling the flow of energy from said source to said motor armature winding, control means for rendering nonconductive said group of valves thereby to reduce the speed of said motor, a loading circuit arranged to be connected across said armature winding, and means responsive to an electrical condition of said armature winding for connecting said load circuit across said winding until a predetermined electrical condition of said motor is obtained.

8. The combination comprising a source of alternating current, a direct current motor having an armature winding, an electric valve converting apparatus interconnecting said source and said motor, said electric valve converting apparatus including a group of valves arranged to control the flow of energy from said source to said motor armature winding, means for controlling said valves to reduce the current transmitted thereby to reduce the speed of said motor, a loading circuit arranged to be connected across said armature winding, and means responsive to said reduced current flow through said armature winding for connecting said load circuit across said armature winding until a predetermined electrical condition of said motor is obtained.

9. The combination comprising a source of alternating current, a direct current motor having an armature winding and a field winding, an electric valve converting apparatus interconnecting said source with said motor, said apparatus including a group of valves for energizing the field winding of said motor, a second group of controlled valves for energizing said armature winding, control means for rendering substantially nonconductive said second group of valves thereby to reduce the speed of said motor, a resistor, a source of periodic potential and an electric valve connected in series, said source of potential resistor and said valve being arranged in parallel with said motor armature winding, and means responsive to the substantial nonconductivity of said second group of valves for rendering conductive said latter valve thereby to dynamically brake said motor.

ELBERT D. SCHNEIDER.